United States Patent
Buchberger et al.

(10) Patent No.: US 8,465,187 B2
(45) Date of Patent: Jun. 18, 2013

(54) LIGHT MODULE FOR A MOTOR VEHICLE HEADLAMP

(75) Inventors: Christian Buchberger, Reutlingen (DE); Ernst-Olaf Rosenhahn, Bodelshausen (DE); Benjamin Stauss, Reutlingen (DE)

(73) Assignee: Automotive Lighting Reutlingen GmbH (DE)

( * ) Notice: Subject to any disclaimer, the term of this patent is extended or adjusted under 35 U.S.C. 154(b) by 358 days.

(21) Appl. No.: 12/845,366

(22) Filed: Jul. 28, 2010

(65) Prior Publication Data
US 2011/0025849 A1    Feb. 3, 2011

(30) Foreign Application Priority Data
Aug. 1, 2009 (DE) .......................... 10 2009 035 743

(51) Int. Cl.
*B60Q 1/04* (2006.01)
*B60Q 1/24* (2006.01)

(52) U.S. Cl.
USPC .......................... 362/539; 362/538; 362/540

(58) Field of Classification Search
USPC .......................... 362/538–540, 460; 348/148
See application file for complete search history.

(56) References Cited

U.S. PATENT DOCUMENTS

| | | | |
|---|---|---|---|
| 2003/0021119 A1 | 1/2003 | Blusseau et al. | |
| 2003/0072167 A1* | 4/2003 | Albou | 362/543 |
| 2005/0041434 A1* | 2/2005 | Yatsuda et al. | 362/459 |
| 2006/0043295 A1* | 3/2006 | Satou et al. | 250/330 |
| 2006/0164852 A1 | 7/2006 | Mochizuki et al. | |
| 2009/0290372 A1* | 11/2009 | Kotajima et al. | 362/539 |
| 2011/0169410 A1* | 7/2011 | Dassanayake et al. | 315/82 |

FOREIGN PATENT DOCUMENTS

| | | |
|---|---|---|
| DE | 3802097 A1 | 9/1989 |
| DE | 43 15 401 A1 | 11/1994 |
| DE | 197 56 437 A1 | 6/1999 |
| DE | 102 48 445 A1 | 5/2003 |
| DE | 103 40 961 A1 | 3/2005 |
| DE | 102006043281 A1 | 3/2008 |

(Continued)

*Primary Examiner* — Karabi Guharay
(74) *Attorney, Agent, or Firm* — Donald R. Boys; Central Coast Patent Agency, Inc

(57) ABSTRACT

The invention relates to a light module (23) for a motor vehicle headlight (2), for generating an adaptive light distribution. The light module (23) comprises a light source (30, 70, 71) for emitting light, a primary optical element (31, 73, 74) for focusing the emitted light, and a diaphragm arrangement (32, 32') for implementing a variable effective upper edge (36, 36'), which can be introduced into a beam path of the emitted and/or focused light. To provide a simple and cost effective way to improve the visibility of the driver of the motor vehicle (1), but not result in a glare to other road users, it is proposed that the diaphragm arrangement (32, 32') is designed to implement an effective upper edge (36, 36') is formed, which brings about the generation of a lower beam light distribution (10) with substantially horizontal light-dark boundary (13) and with an illuminated region (14) formed at a specific horizontal position above the light-dark boundary (13), which region is delimited on the right-hand side and on the left-hand side by light-dark boundaries and has an extent in the horizontal and vertical directions of in each case a few angular degrees on a measuring screen arranged at a distance in front of the headlamp (2). By pivoting the light module (23) horizontally the light can be directed precisely, the illuminated region (14) can be moved in the horizontal direction onto detected objects in a front of the vehicle (1).

17 Claims, 6 Drawing Sheets

FOREIGN PATENT DOCUMENTS

| | | |
|---|---|---|
| DE | 102007045150 A1 | 4/2008 |
| DE | 102007050348 A1 | 8/2008 |
| EP | 1 201 989 A2 | 2/2002 |
| EP | 1 806 531 A1 | 7/2007 |
| WO | 2008/037388 A2 | 4/2008 |
| WO | 2009039882 A1 | 4/2009 |

* cited by examiner

LIGHT MODULE FOR A MOTOR VEHICLE HEADLAMP

CROSS-REFERENCE TO RELATED DOCUMENTS

The present application claims priority to German patent application serial number 10 2009 035 743.2, which was filed on Aug. 1, 2009, which is incorporated herein in its entirety, at least by reference.

The present invention relates to a light module for a motor vehicle headlamp. The light module is used for generating an adaptive light distribution and comprises:
- at least one light source for emitting light,
- at least one primary optical element for focusing the emitted light,
- a diaphragm arrangement for implementing a variable effective upper edge, which can be introduced into a beam path of the emitted and/or focused light for generating a light distribution with a substantially horizontal light-dark boundary corresponding to the profile of the effective upper edge, and
- a secondary optical element, preferably in the form of a projection lens, for imaging the light passing the effective upper edge of the diaphragm arrangement on a roadway in front of the vehicle.

The invention also relates to a motor vehicle headlamp with a light module of the mentioned type.

Finally, the present invention also relates to a headlamp system for a motor vehicle for illuminating a roadway in front of the motor vehicle with an adaptive light distribution. The headlamp system comprises, on the nose of the vehicle, in each case at least one motor vehicle headlamp on the vehicle's own traffic side and on the opposing traffic side, means for recording an image of a region in front of the vehicle and means for evaluating the recorded image for detecting objects in front of the vehicle. At least one of the headlamps has at least one light module for generating an adaptive light distribution of the type mentioned at the outset.

DE 10 2007 050 348 A1 has disclosed a light module of the type mentioned at the outset, for example. Said document discloses the use of a diaphragm arrangement which has a plurality of diaphragm elements which run substantially transversely with respect to the optical axis of the light module and are capable of moving relative to one another about a horizontal axis of rotation arranged parallel to the optical axis. The diaphragm elements have upper edges with different contours. An effective upper edge of the diaphragm arrangement, which upper edge is arranged in the beam path, is achieved by one of the upper edges or by a plurality of upper edges being superimposed. By moving the diaphragm elements relative to one another, the profile of the effective upper edge of the diaphragm arrangement can be varied. The effective upper edge of the diaphragm arrangement can be introduced into the beam path of the light emitted by the light source and/or focused by the primary optical element in order to generate a lower beam light distribution with a substantially horizontal light-dark boundary. In this way, different light distributions which are matched to the various traffic and environmental conditions can be achieved. Traffic conditions are, for example, road users traveling in front or oncoming road users, detected objects (people or inanimate objects) on the roadway or at the edge of the roadway, the traffic density, the roadway condition etc. Environmental conditions include in particular the weather (for example fog, rain, snow, ice) or the time of day or the current light conditions (for example sun, cloud, dusk, darkness). In particular, a poor weather light (a development of the foglight), a conventional lower beam light distribution with a symmetrical or asymmetrical light-dark boundary, a country road light, a motorway light, a city light, a partial upper beam or a conventional upper beam can thus be generated, with the effective upper edge of the diaphragm arrangement being arranged virtually completely outside the beam path for the upper beam.

The traffic situation and the environmental conditions in the surrounding environment of the vehicle can be recorded by means of suitable sensors. In order to record the traffic conditions, in particular the volume of traffic located in front of the vehicle, cameras (for visible light, IR radiation or UV radiation), radar sensors, ultrasound sensors or other suitable sensors can be used. The images of the region in front of the vehicle which are recorded by these sensors are evaluated by a computation unit using suitable algorithms and are used for controlling the diaphragm arrangement and therefore ultimately for generating an adaptive light distribution in front of the vehicle. The environmental conditions can be recorded using rain or snow sensors, light sensors, a thermometer and other suitable sensors. A combined use of a plurality of different sensors for recording traffic and environmental conditions is also conceivable.

DE 103 21 435 A1 has disclosed another light module of the type mentioned at the outset. Said document discloses the use of a diaphragm arrangement which comprises a freeform drum which is capable of rotating about a horizontal axis of rotation running transversely with respect to the optical axis, with a plurality of upper edges, which run transversely with respect to the optical axis, are spaced apart from one another circumferentially and have different contour profiles, being formed on the outer surface of said freeform drum. Depending on the desired light distribution, the drum can be rotated about the axis of rotation such that the corresponding upper edge is introduced in the beam path of the light emitted by the light source and/or focused by the primary optical element. In this case, the upper edge of the drum arranged respectively in the beam path forms the effective upper edge of the diaphragm arrangement.

The described light modules for generating an adaptive light distribution already provide a considerable safety advantage in comparison with conventional light modules which could generate only one light function (for example lower beam, upper beam or foglight) or could be switched between different light functions, since a large number of different light functions is available and the optimum light distribution can be selected for the respective traffic and environmental situation. As a result, the visual conditions for the driver are improved considerably without there being any fear of glare for other road users which would lead to traffic safety being impaired. Nevertheless, the known light modules also have potential as regards an improvement in the visual conditions for the driver, but without resulting in any glare for the other road users.

The present invention is therefore based on the object of providing a simple and inexpensive possibility of improving the visual conditions for the driver of a motor vehicle, in particular as regards objects which are potentially hazardous to traffic in the region in front of the motor vehicle, but without resulting in any glare for other road users.

In order to solve this problem, the invention proposes, on the basis of the light module of the type mentioned at the outset, providing the diaphragm arrangement for implementing an effective upper edge, which brings about the generation of a lower beam light distribution with a substantially horizontal light-dark boundary and with an illuminated region formed at a certain horizontal position above the lightdark boundary, which region is delimited on the right-hand side and on the left-hand side by preferably vertically running light-dark boundaries and has an extent in the horizontal and vertical directions of in each case a few angular degrees on a measuring screen arranged at a distance in front of the headlamp.

In the case of the light distribution generated by the light module according to the invention, therefore, only a region which is very limited in particular as regards its extent in the horizontal direction is illuminated above the horizontal light-dark boundary. This has considerable advantages in comparison with the partial upper beam light distribution known per se, in which virtually the entire region on the vehicle's own traffic side or alternatively on the opposing traffic side with an upper beam light distribution is illuminated above a horizontal light-dark boundary. This illuminated region arranged above the light-dark boundary can be positioned in the horizontal direction, for example, in such a way that it illuminates the edge of the roadway to a greater extent on the vehicle's own traffic side. In this way, for example, if an object which is potentially hazardous for traffic in the form of a person or an inanimate object is detected at the edge of the roadway by suitable sensors, the lower beam light distribution with the horizontal light-dark boundary and the illuminated region formed above the light-dark boundary can be activated at least for a short period of time in order to illuminate the detected object with the region arranged above the light-dark boundary. The driver's attention is thereby directed to the detected object. The driver can avoid the detected and illuminated object, reduce the vehicle speed or take other suitable measures for avoiding a collision with the object and/or to avoid endangering the object. It is therefore possible by means of the present invention to achieve a considerable increase in safety both for the driver and for the detected objects. At the same time, glare for road users in front or oncoming road users is largely avoided since the extent of the illuminated region formed above the light-dark boundary is only a few angular degrees in the horizontal direction and is generally only activated for a relatively short period of time.

The invention proposes that the light module has a secondary optical element, preferably in the form of a projection lens, for imaging the light passing the effective upper edge of the diaphragm arrangement on a roadway in front of the vehicle. The secondary optical element images the effective upper edge of the diaphragm arrangement as the light-dark boundary of the light distribution on the roadway. In this case, the light module would therefore be in the form of a so-called projection module. In order to comply with the brightness profile of the light-dark boundary or to eliminate color effects at the light-dark boundary, the projection lens is preferably provided with regular or irregular microstructures, which have a height of approximately 3-30 μm with respect to the base surface of the lens. The surface of the lens is preferably planar-convex or in the form of a meniscus.

An advantageous development of the present invention proposes that the illuminated region above the horizontal light-dark boundary has an extent of approximately 2° horizontal and approximately 3° to 5° vertical. The width of the illuminated region is measured from a lateral light-dark boundary running approximately vertically to the opposite lateral light-dark boundary running approximately vertically. The height of the illuminated region is measured starting from the horizontal light-dark boundary upwards to the upper end of the illuminated region. It is of course possible for the illuminated region, in particular in the vertical direction, to have an extent of markedly more than 3°, which is advantageous for illuminating objects which are far above the roadway, for example people on a motorway bridge. The extent in the horizontal direction can also be markedly more than 2° in certain situations. It is thus conceivable, for example, if the illuminated region above the horizontal light-dark boundary is positioned in the horizontal direction in such a way that it illuminates the edge of the roadway on the vehicle's own traffic side, for the illuminated region to extend outwards relatively far in the direction of the vehicle's own traffic side beyond the edge of the roadway. It is conceivable for the width and the height of the illuminated region above the light-dark boundary to be variable during correct operation of the light module. However, the width and the height of the illuminated region above the light-dark boundary is preferably fixed and is not varied during operation of the light module.

It is particularly preferred if the horizontal position of the illuminated region arranged above the light-dark boundary of the light distribution can be varied. As a result, the illuminated region can always be directed precisely onto the detected object and can clearly illuminate the object in order to make it possible for said object to be detected and identified directly by the driver. This is important since the measure to be selected by the driver for avoiding a collision with the object or for avoiding endangering the object will primarily depend on the type of object. For example, in the case of playing children or animals, the choice of measure will be different than, for example, in the case of inanimate objects.

Another advantageous development of the present invention proposes that the light module comprises means for horizontally pivoting the light module or a part thereof in order to direct the illuminated region above the horizontal light-dark boundary in a targeted manner onto objects detected in front of the vehicle. In this way, the illuminated region can be moved in the horizontal direction in a targeted manner to a position where objects which are a potential hazard to traffic, for example people or animals which are crossing the roadway in front of the vehicle, have been detected. As a result of the short extent of the illuminated region in the horizontal direction of only a few angular degrees, the detected object can be illuminated in a targeted manner without road users traveling in front and/or oncoming road users being affected by glare.

It is particularly advantageous if the means for horizontally pivoting the light module are provided for implementing a dynamic cornering light function of the headlamp. In this case, means which are actually in any case provided for another purpose in the light module or the headlamp could be used for pivoting the illuminated region above the horizontal light-dark boundary. Additional mechanical components (actuators, gears, coupling elements etc.) for implementing a pivoting movement of the illuminated region arranged above the light-dark boundary in the horizontal direction are therefore not required.

A preferred embodiment of the present invention proposes that the diaphragm arrangement is in the form of a freeform drum which is capable of rotating about a horizontal axis of rotation running transversely with respect to the optical axis, with a plurality of upper edges, which run transversely with respect to the optical axis, are spaced apart from one another in the circumferential direction and have different contour profiles, being formed on the outer surface of said freeform drum, and with one of the upper edges forming the effective upper edge of the diaphragm arrangement for generating the lower beam light distribution with the illuminated region provided above the light-dark boundary. The upper edge for generating the lower beam light distribution with the illuminated region provided above the light-dark boundary has substantially the same profile as an upper edge which is used for generating a light distribution with a horizontal light-dark boundary (for example lower beam, foglight or the like). In addition, however, a slot is provided in the upper edge and is used for generating the illuminated region of the light distribution above the light-dark boundary.

The horizontal light-dark boundary can be designed to be symmetrical, i.e. the entire light-dark boundary extends slightly (approximately −1°) below the vertical VV on the measuring screen arranged in front of the vehicle. The horizontal light-dark boundary can also be designed to be asymmetrical, however, with a horizontal section on the opposing traffic side and a comparatively higher section on the vehicle's own traffic side. The transition between the lower section of the light-dark boundary on the opposing traffic side and the higher section on the vehicle's own traffic side can be either stepped or can have another form, for example a sloping incline, in particular an incline of 15°.

In the freeform drums, the space on the outer surface for arranging the various upper edges with different contour profiles is restricted. The distance in the circumferential direction between adjacent upper edges applied on the outer surface needs to be large enough for adjacent upper edges not to disrupt one another when generating the desired light distribution. Therefore, in the case of a diaphragm arrangement with such a configuration, only a restricted number of different upper edges can be arranged on the outer surface of the drum. In order to implement the light distribution with the illuminated region arranged above the light-dark boundary, the invention therefore proposes arranging the corresponding upper edge in place of another upper edge on the outer surface of the drum. Another upper edge which is used for generating a light distribution which is only rarely activated in practice is preferably replaced. Such a light distribution is, for example, the partial upper beam on the opposing traffic side. This is generated by the headlamp arranged on the nose of the vehicle on the opposing traffic side or by a light module of this headlamp. The headlamp arranged on the nose of the vehicle on the vehicle's own traffic side forms the corresponding partial upper beam for the vehicle's own traffic side. In the case of a simplified headlamp system, only one of the headlamps in the system, for example the headlamp arranged on the opposing traffic side, can generate the lower beam light distribution with the illuminated region provided above the light-dark boundary. It is of course also possible in the simplified system for only that headlamp which is arranged on the vehicle's own traffic side to be designed for generating the lower beam light distribution with the illuminated region provided above the light-dark boundary.

As an alternative, the invention proposes that the diaphragm arrangement has a plurality of diaphragm elements which run substantially transversely with respect to the optical axis of the light module and are capable of moving relative to one another about a horizontal axis of rotation arranged parallel to the optical axis, with one of the upper edges or a plurality of upper edges forming, by means of superimposition, the effective upper edge arranged in the beam path for generating the lower beam light distribution with the illuminated region provided above the light-dark boundary. In this case, the effective upper edge has a similar design to an upper edge for generating a conventional lower beam light distribution with a light-dark boundary, with it having a slot, in contrast to the upper edge for generating the conventional lower beam light distribution. In order that the effective upper edge has the mentioned contour, an upper edge of either a single or a plurality of diaphragm elements is provided with a slot.

The light module can have any desired light source. For example, a conventional incandescent lamp, a gas discharge lamp or a light exit surface of a fiberoptic conductor is conceivable. A preferred embodiment proposes that the at least one light source comprises one or more semiconductor light sources (LEDs).

The primary optical element can comprise a reflector, for example. However, one exemplary embodiment of the invention proposes that the at least one primary optical element has one or more optically effective elements made from a transparent material which focus the emitted light by means of total reflection. These optically effective elements function in a similar way to optical waveguides in accordance with the principle of total reflection and enable focusing of the light emitted by the light sources in a particularly efficient manner, in particular with particularly low reflection losses. The use of such optically effective elements is particularly advantageous in conjunction with the use of semiconductor light sources. In this case, it is conceivable for a dedicated optical element to be assigned to each semiconductor light source. Light sources and optical elements can be arranged in so-called arrays.

In order to solve the problem addressed by the present invention, the invention furthermore proposes a motor vehicle headlamp which has at least one light module according to the invention.

If the motor vehicle headlamp has a plurality of light modules which generate a basic light distribution and a spotlight distribution which are both superimposed in order to implement the lower beam light distribution, it is particularly advantageous if the light module designed in accordance with the invention is designed for implementing the spotlight function. The basic light module illuminates the region in front of the vehicle with a particularly wide range. The basic light distribution has a light-dark boundary, preferably a symmetrical light-dark boundary. In order to generate the lower beam light distribution, the spotlight distribution is superimposed on the basic light distribution. The spotlight distribution preferably also has a light-dark boundary (symmetrical or asymmetrical). In order to implement a cornering light function of the headlamp, the spotlight module is only capable of being moved in the horizontal direction. In order to vary the horizontal position of the illuminated region of the light distribution which is provided above the light-dark boundary, the spotlight module can be pivoted in the horizontal direction. As a result, the lower beam spotlight distribution together with the illuminated region arranged above the light-dark boundary is moved relative to the basic light distribution in the horizontal direction and is directed in a targeted manner onto a detected object, above or next to the roadway.

As a further solution to the problem of the present invention, on the basis of the headlamp system of the type mentioned at the outset, a headlamp system is proposed in which at least one light module is formed by at least one of the headlamps in the manner in accordance with the invention.

An advantageous development of the invention proposes that only that headlamp in the headlamp system which is arranged on the opposing traffic side has a light module designed according to the invention with an upper edge designed in such a way that said headlamp can generate the lower beam light distribution with the illuminated region provided above the light-dark boundary.

A preferred embodiment of the present invention proposes that the headlamp system has means for recording an image of a region in front of the vehicle and means for evaluating the recorded image for detecting objects in front of the vehicle, with the means for recording the image of a region in front of the vehicle being in the form of a camera (for visible light, IR radiation or UV radiation). It is of course also conceivable for the means for recording the image of a region in front of the vehicle to be in the form of radar sensors or ultrasound sensors. It is also possible to use a plurality of the mentioned sensors or other sensors jointly for detecting objects which are potentially hazardous to traffic in front of the vehicle. It is likewise conceivable that sensors which are already provided in any case in the vehicle are used for recording an image of a region in front of the vehicle. In this case, it would not be necessary for any additional sensors to be provided in the motor vehicle for the present invention. In particular, it is advantageous if the camera records the image by receiving and processing invisible IR radiation and if the camera is part of a night vision system of the vehicle, which night vision system presents the driver of the vehicle with the image, recorded by means of the camera, of the region in front of the vehicle by means of a display or a projection onto a windshield of the vehicle or onto other points in the vehicle. Under certain circumstances, the night vision system is already equipped with a system for detecting objects in front of the vehicle. The corresponding signals of the night vision system can be tapped off, for example, from a bus system of the motor vehicle and used for controlling the light module for generating the lower beam light distribution with the illuminated region arranged above the light-dark boundary. The light module according to the invention can therefore use signals which are already present on the vehicle bus.

Further features and advantages of the present invention will be explained in more detail below with reference to the figures, in which.

Figure 3:
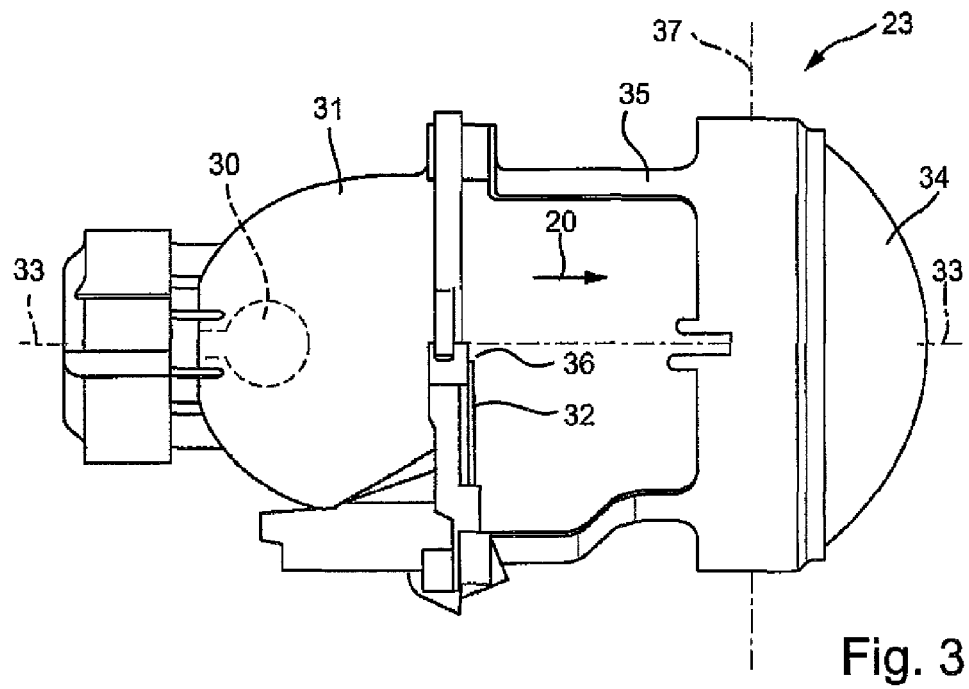
FIG. 3 shows a light module according to the invention in accordance with a first preferred embodiment.
Figure 4:
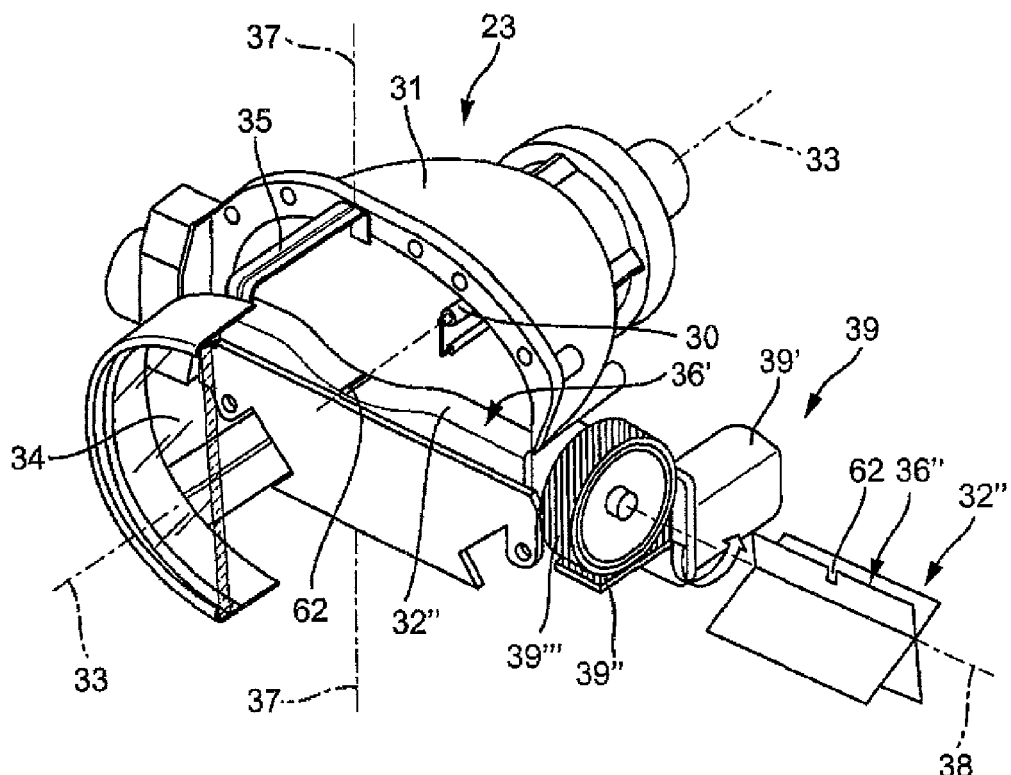
FIG. 4 shows a light module according to the invention in accordance with a second preferred embodiment.
Figure 5:
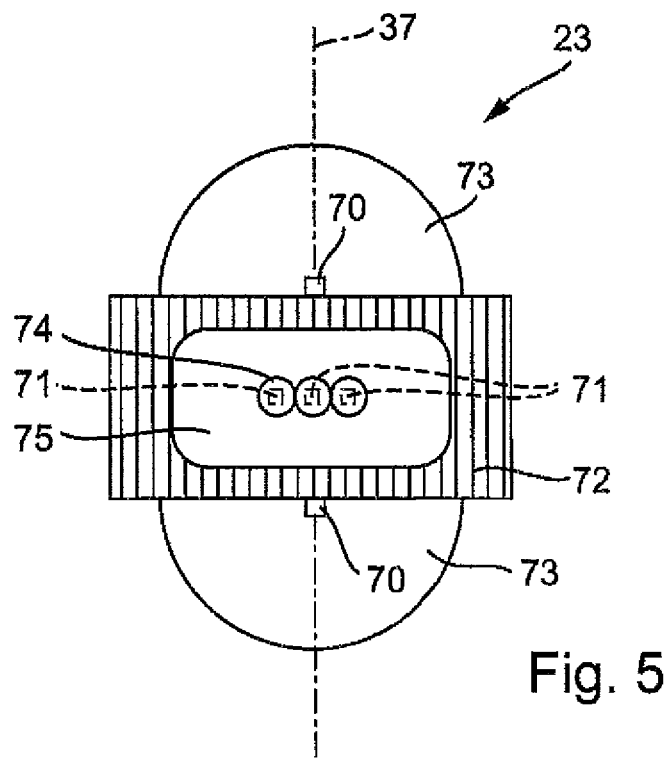
FIG. 5 shows a light module according to the invention in accordance with a third preferred embodiment.
Figure 7A:
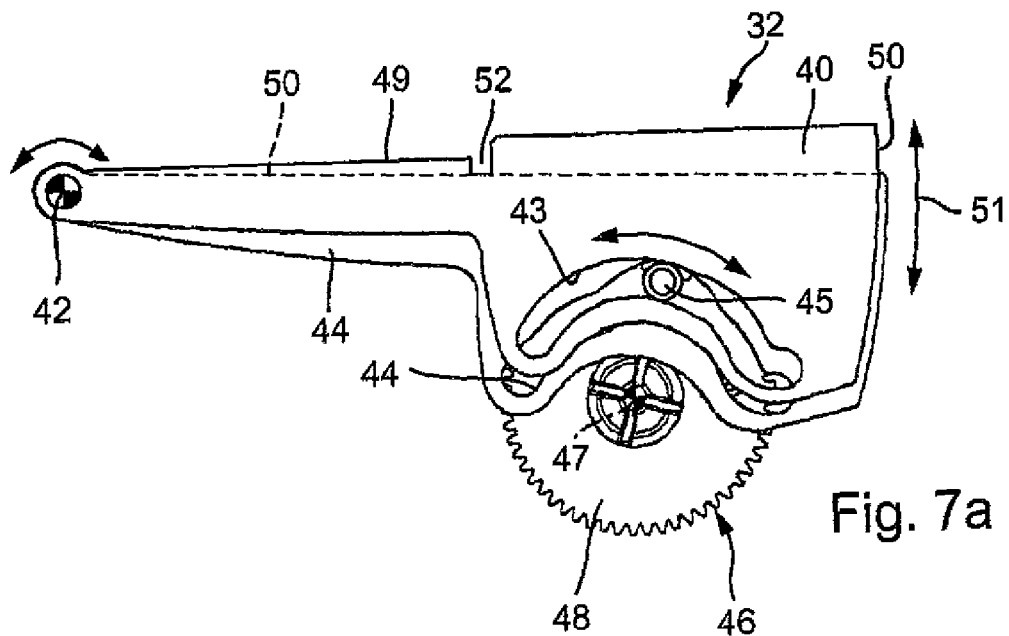
Figure 7B:
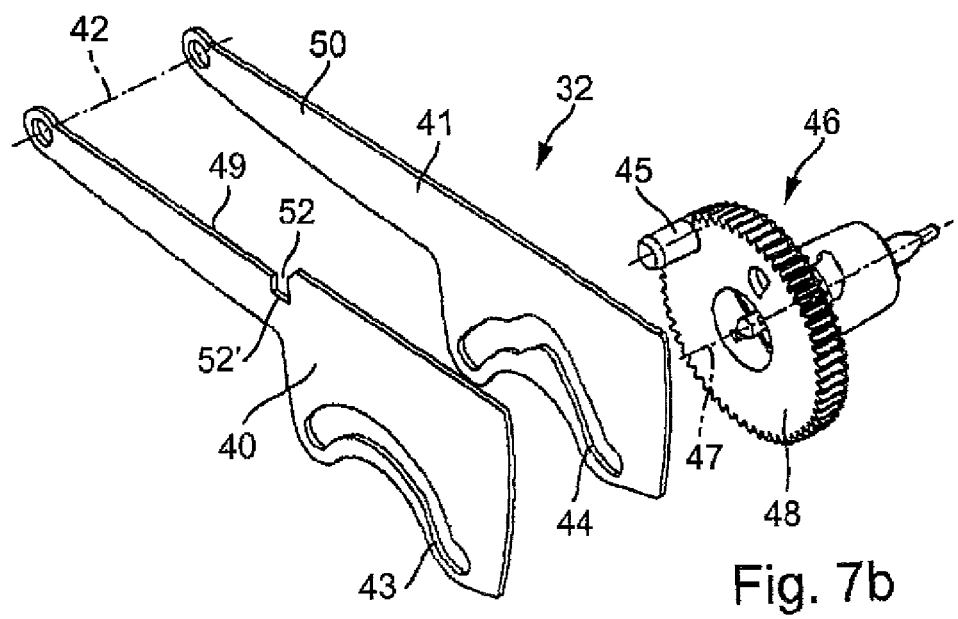
Figure 8:
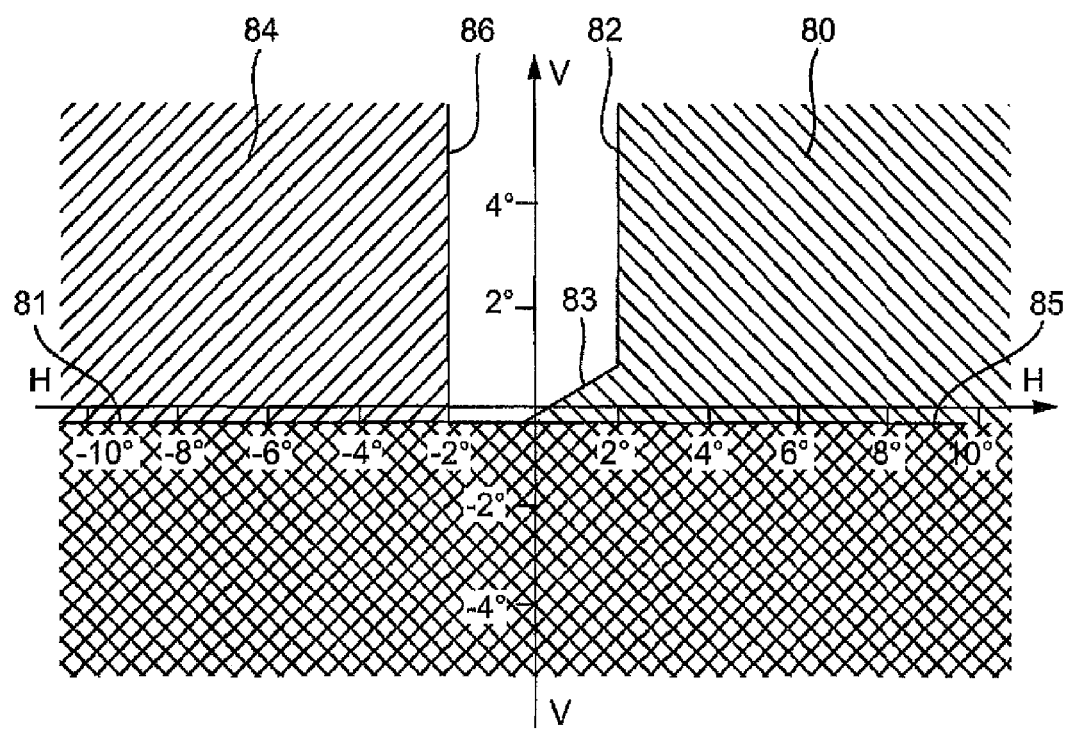
Figure 9:
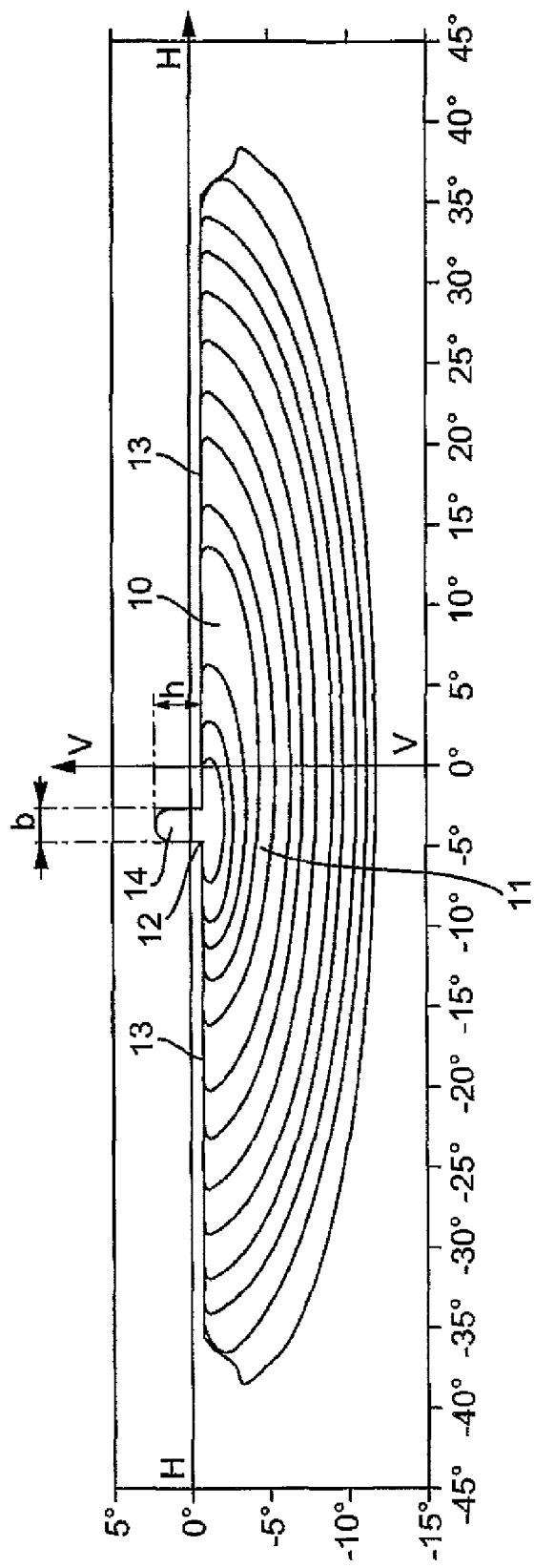

FIGS. 7*a* and 7*b* show a diaphragm arrangement of the light module shown in FIG. 3 in various views;

FIG. 8 shows a partial upper beam light distribution imaged on a measuring screen arranged at a distance from a motor vehicle; and FIG. 9 shows a light distribution which can be achieved with one of the light modules according to the invention as shown in FIGS. 3 to 5.

Figure 1:
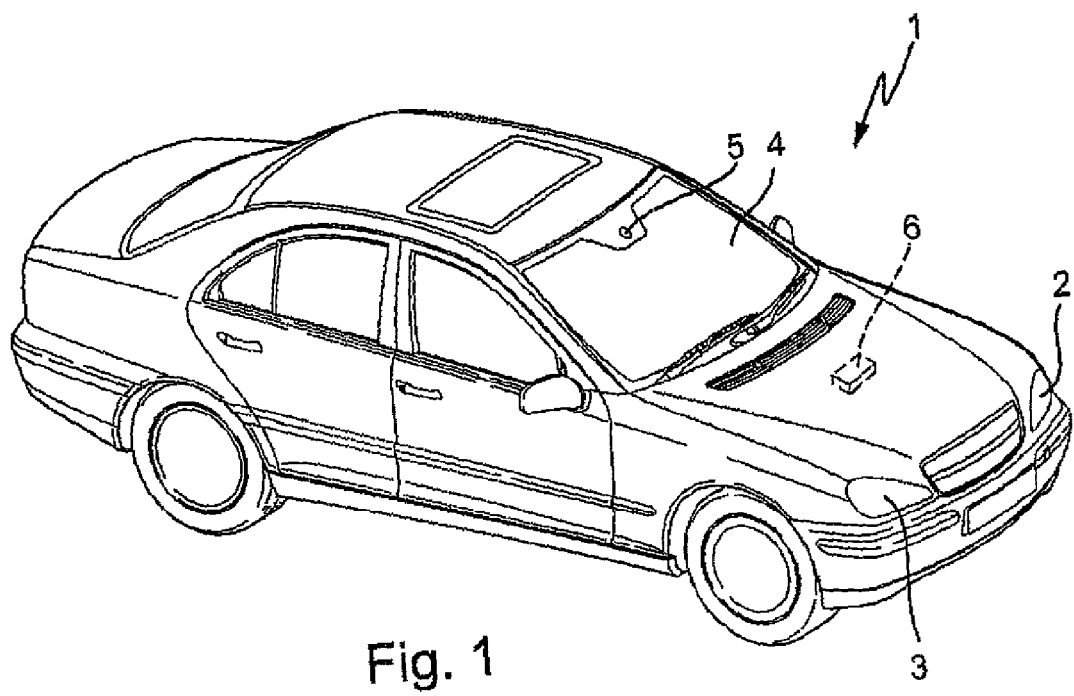
FIG. 1 shows a motor vehicle with a headlamp system according to the invention in accordance with a preferred embodiment.

In FIG. 1, a motor vehicle in its entirety is denoted by the reference symbol 1. The vehicle 1 illustrated by way of example is designed for right-hand traffic. The present invention is of course not restricted to right-hand traffic, but can correspondingly also be used for left-hand traffic. Two headlamps 2, 3 are provided on the nose of the vehicle. Each of the headlamps 2, 3 comprises at least one light module, which is designed to generate a lower beam light distribution with an illuminated region arranged above the light-dark boundary. A sensor 5 which is directed in the direction of travel and is in the form of a camera is arranged behind a windshield 4 of the vehicle 1. The sensor 5 records a region in front of the vehicle 1 and generates a corresponding image. The image is processed by a computer 6 arranged in the vehicle 1 in order to detect objects, for example inanimate objects, people or animals, arranged in front of the vehicle. Depending on the position of a detected object, at least one light module of at least one headlamp 2, 3 is then driven in such a way that the illuminated region arranged above the light-dark boundary illuminates the detected object. The object can be illuminated briefly once, intermittently, for a relatively long period of time, at most until the vehicle has been driven past the object, or in another way. It is also conceivable for the object to be illuminated with varying brightness. It is thus conceivable, for example, to illuminate the detected object first at a low brightness in order to avoid frightening the object, for example if the object is a person or an animal, and then to gradually increase the brightness.

The lower beam light distribution generated by the at least one light module of the at least one headlamp 2, 3 with the illuminated region arranged above the light-dark boundary is illustrated in FIG. 9. FIG. 9 shows the light distribution on a measuring screen arranged in front of the vehicle. A vertical VV and a horizontal HH are illustrated on the measuring screen. The light distribution is denoted by the reference symbol 10. The lines 11 illustrated in the light distribution 10 are so-called isolux lines which identify regions of identical illuminance. A region 12 of the light distribution 10 with the greatest illuminance is approximately 0° horizontal in the case of a light module with a horizontal zero position. The light distribution 10 shown in FIG. 9 has been pivoted towards the left through approximately 4°-5°. Consequently, in the exemplary embodiment illustrated, the region 12 with the greatest illuminance is approximately 4° to 5° to the left of the vertical VV and approximately 1° to 2° below the horizontal HH.

The light distribution 10 comprises a basic light distribution which is upwardly limited by a substantially horizontal light-dark boundary 13. In the exemplary embodiment illustrated, the light-dark boundary 13 is symmetrical, i.e. it has approximately the same horizontal profile on the vehicle's own traffic side and on the opposing traffic side. It would of course also be possible for the light-dark boundary 13 to be asymmetrical, with a section of the light-dark boundary 13 on the vehicle's own traffic side then being arranged above a section on the opposing traffic side. The transition between the two sections can take place stepwise or in another way, for example by means of a section with an incline at an angle of 15°. The illustrated basic light distribution extends in the horizontal direction from approximately −40° to +40° and in the vertical direction from approximately −13° to approximately −1°.

The light distribution 10 also comprises an illuminated region 14 which is arranged above the light-dark boundary 13 and is delimited laterally, at least in regions, by approximately vertical light-dark boundaries. In the exemplary embodiment illustrated, the lateral light-dark boundaries run substantially vertically towards the basic light distribution and are bent inwards towards the top, with the result that the region 14 has the form of a semicircle towards the top. The form of the region 14 can of course in practice deviate from the illustrated form. However, it is important that the region 14 has an extent of only a few degrees both in the horizontal and in the vertical direction. In this case, the width is measured from a point where the gradient of the brightness distribution exceeds a specific value, preferably has a maximum, on the left-hand side of the region 14 to a corresponding point on the right-hand side of the region 14. Said points are generally located at the left-hand dark-light transition or at the right-hand light-dark transition of the region 14. In the exemplary embodiment illustrated, the region 14 has a width b of approximately 2° and a height h of approximately 3°. In the example illustrated, the region 14 is arranged above the region 12 of the basic light distribution with the highest illuminance. In a light module with a horizontal zero position, the region 14 is approximately on the vertical VV. As a result of the pivoting of the module generating the light distribution 10 in FIG. 9 through approximately 4°-5° towards the left, the region 14 in the exemplary embodiment illustrated is also approximately 4°-5° to the left of the vertical VV.

The light distribution 10 can of course also have a different design. It is conceivable, for example, for the region 12 of the greatest illuminance in the horizontal zero position of the light module not to be arranged on the vertical, but to be offset laterally with respect thereto. The same applies to the illuminated region 14 above the light-dark boundary 13, which could likewise be arranged laterally offset with respect to the vertical in the horizontal zero position of the module.

Figure 2:
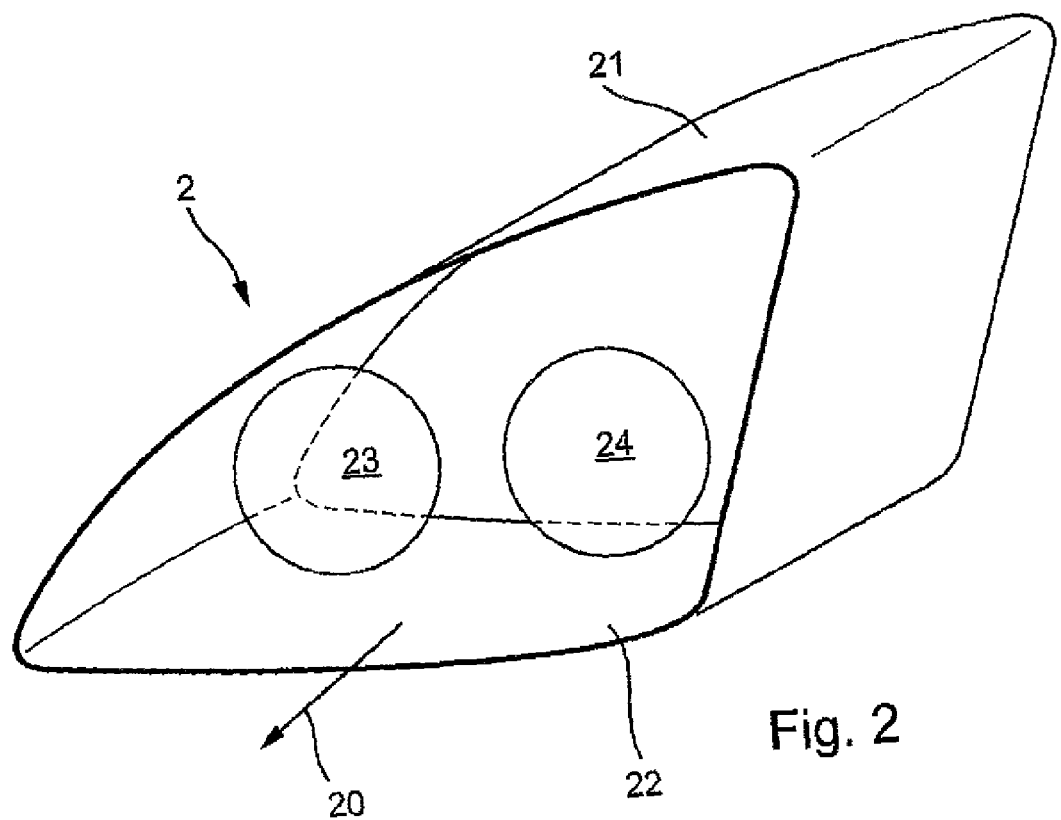
FIG. 2 shows a motor vehicle headlamp according to the invention in accordance with a preferred embodiment.

FIG. 2 illustrates an example of a headlamp 2 of the vehicle 1, said headlamp being arranged on the opposing traffic side. The headlamp 2 comprises a housing 21 which is open in the light exit direction 20. The opening of the housing 21 is closed by a transparent cover plate 22. Regions of the cover plate 22 can be formed with or without optically effective elements (for example prisms). Said cover plate is made from a transparent plastic or glass. At least one light module 23, 24 is arranged in the interior of the housing 21. In the exemplary embodiment illustrated, two light modules 23, 24 are provided. In this case, one light module 24 can be designed to generate a basic light distribution, which brings about particularly broad illumination of the roadway in front of the vehicle, and the other light module 23 can be designed to generate a spotlight distribution, which is concentrated in a central region of the light distribution 10. The basic light distribution extends, for example, in the horizontal direction from −40° to +40° and in the vertical direction from −13° to −1° in FIG. 9. The spotlight distribution extends, for example, from −10° to +2° and in the vertical direction from −4° to −1°. In particular, the spotlight distribution can of course have an extent which deviates from the values given by way of example. The two partial light distributions are superimposed to give the light distribution 10. The light distribution shown in FIG. 9 can of course also be generated by a single light module, for example the light module 23 on its own.

FIG. 3 illustrates an example of the light module 23. The module 23 is in the form of a projection module. It has a light source 30, which can be in the form of an incandescent lamp, a gas discharge lamp, a light exit surface of a fiberoptic conductor or in the form of at least one semiconductor light source (LED), for example. The light emitted by the light source 30 is focused by a primary optical element 31, which is in the form of a reflector, preferably in the form of an ellipsoidal or freeform reflector, in the exemplary embodiment illustrated. It can of course also have a different design, for example can be in the form of a transparent optical element which focuses the emitted light by means of total reflection, in particular if the light source comprises LEDs. A diaphragm arrangement 32 is arranged in the beam path in the light exit direction 20 after the primary optical element 31, said diaphragm arrangement 32 shading some of the focused light. The diaphragm arrangement 32 extends in a substantially vertical plane perpendicular to an optical axis 33 of the module 23 and below the optical axis 33. A secondary optical element 34 is arranged in the beam path in the light exit direction 20 after the diaphragm arrangement 32, said secondary optical element 34 being in the form of a projection lens in the embodiment illustrated. The lens 34 is fixed at the front edge of the reflector 31 by means of a holding frame 35. The projection lens 34 projects the light passing the diaphragm arrangement 32 onto the roadway in front of the vehicle 1. In this case, an upper edge 36 of the diaphragm arrangement 32 as the light-dark boundary 13 is projected onto the roadway. The upper edge 36 has a profile corresponding to the light-dark boundary 13. In order to implement a dynamic cornering light function, the entire projection module 23 is capable of being pivoted about a vertical axis of rotation 37. It is of course also possible for the cornering light function to be achieved by virtue of merely parts of the module 23, for example the lens 34, being pivoted.

An example of the configuration of the diaphragm arrangement 32 is illustrated in FIGS. 7a and 7b. The diaphragm arrangement 32 comprises a plurality of diaphragm elements 40, 41. In the exemplary embodiment illustrated, only two diaphragm elements 40, 41 are provided. Said diaphragm elements 40, 41 extend in a vertical plane running substantially transversely with respect to the optical axis 33 of the light module 23. The diaphragm elements are mounted such that they are capable of moving about an axis of rotation 42 which runs substantially parallel to the optical axis 33. Each diaphragm element 40, 41 has a slotted-link guide 43, 44, which are preferably designed to be different. A guide pin 45 of an actuator 46 engages in the slotted links 43, 44. In the exemplary embodiment illustrated, the guide pin 45 is arranged eccentrically on a wheel 48 which is capable of rotating about an axis of rotation 47. The axis of rotation 47 preferably runs parallel to the axis of rotation 42 of the diaphragm elements 40, 41 and to the optical axis 33 of the light module 23. The diaphragm elements 40, 41 have upper edges 49, 50 with preferably different contours.

By actuating the actuator 46, the guide pin 45 is moved in the slotted links 43, 44. Since the axes of rotation 42, 48 are fixed, a movement of the pin 45 in the slotted links 43, 44 results in a pivoting movement 51 of the diaphragm elements 40, 41 about the axis of rotation 42. The effective upper edge of the entire diaphragm arrangement 32, which upper edge is arranged in the beam path, results from a superimposition of the upper edges 49, 50 of the two diaphragm elements 40, 41. By moving the pin 45 in the slotted links 43, 44, the profile of the effective upper edge of the diaphragm arrangement 32 can be varied. In the position of the diaphragm elements 40, 41 relative to one another illustrated in FIG. 7a, the effective upper edge is formed on its own by the upper edge 49 of the diaphragm element 40 since the upper edge 50 of the other diaphragm element 41 is covered completely by the element 40.

A slot 52 is formed in the upper edge 49 of the diaphragm element 40 and serves the purpose of generating that illuminated region 14 of the light distribution 10 which is arranged above the light-dark boundary 13. In the exemplary embodiment illustrated, the region 14 is generated on its own by the slot 52 in the upper edge 49. However, it would also be conceivable for the region 14 to be generated by interaction of the two upper edges 49, 50 of the diaphragm elements 40, 41. By raising the diaphragm element 41 relative to the diaphragm element 40, it would be possible, for example, for the upper edge 50 to be raised beyond a substantially horizontal bottom section 52' of the slot 52, with the result that the upper edge 50 defines the height h of the illuminated region 14 above the light-dark boundary 13. It would thus also be possible to achieve a dynamic variation in the height h of the region 14.

By pivoting the light module 23 or parts thereof about the vertical pivot axis 37, the region 14 above the light-dark boundary 13 of the light distribution 10 can be pivoted in the horizontal direction. Thus, the illuminated region 14 can be directed in a targeted manner onto objects detected in front of the vehicle 1. The driver's attention is thus directed particularly to the potentially hazardous objects. The detected objects are therefore highlighted in the actually existing environment and not on some form of representation (for example on a display) or projection (for example on the windshield or on a transparent body in the field of vision of the driver) of the environment. The driver can always direct his whole attention to the roadway in front of his vehicle 1 and does not need to turn away his eyes in order to see projections or warning lights on displays. The present invention therefore makes it possible to achieve a decisive increase in safety for the driver and the detected objects without other road users being affected by glare or being endangered in another way thereby.

FIG. 4 illustrates a further example of the light module 23. The module 23 has considerable similarity with the module shown in FIG. 3. Corresponding components are denoted by the same reference symbols. The module 23 shown in FIG. 4 differs from that shown in FIG. 3 in particular by the configuration and mode of operation of the diaphragm arrangement 32'. The diaphragm arrangement 32' is in the form of a freeform drum, with different upper edges 36' with different contour profiles being formed on the outer surface of said freeform drum. The drum is capable of rotating about an axis of rotation 38 which runs transversely with respect to the optical axis 33 of the light module 23 and approximately horizontally. In order to implement the rotary movement of the drum 32', an actuator 39 comprising an electric motor 39', in particular a stepper motor, a worm gear 39" driven thereby and a toothed gear 39''', which is driven by the worm gear and is connected to the drum 32' in a manner fixed against rotation. By rotating the diaphragm arrangement 32', one of the upper edges 36' can be moved as effective upper edge into the beam path of the module 23. The effective upper edge 36' is then projected by the projection lens 34 as the light-dark boundary onto the roadway in front of the motor vehicle.

In FIG. 4, a symbolic illustration of the freeform drum 32' for illustrating the mode of operation thereof is reproduced by the reference symbol 32". In the example, four different diaphragm elements with upper edges 36" with different contour profiles are arranged on the outer surface of the drum 32". The individual diaphragm elements or the upper edges 36" thereof are spaced apart from one another by approximately 90° in the circumferential direction. For simplified illustration, the upper edges 36" of the symbolic illustration of the drum 32" all have a horizontal profile. With such a profile, it would be possible for a symmetrical light-dark boundary to be produced. In fact, the upper edges 36" can also have a different profile, for example for generating an asymmetrical light-dark boundary. Such an exemplary embodiment of a freeform drum 32" is illustrated in FIG. 6, for example.

Figure 6:
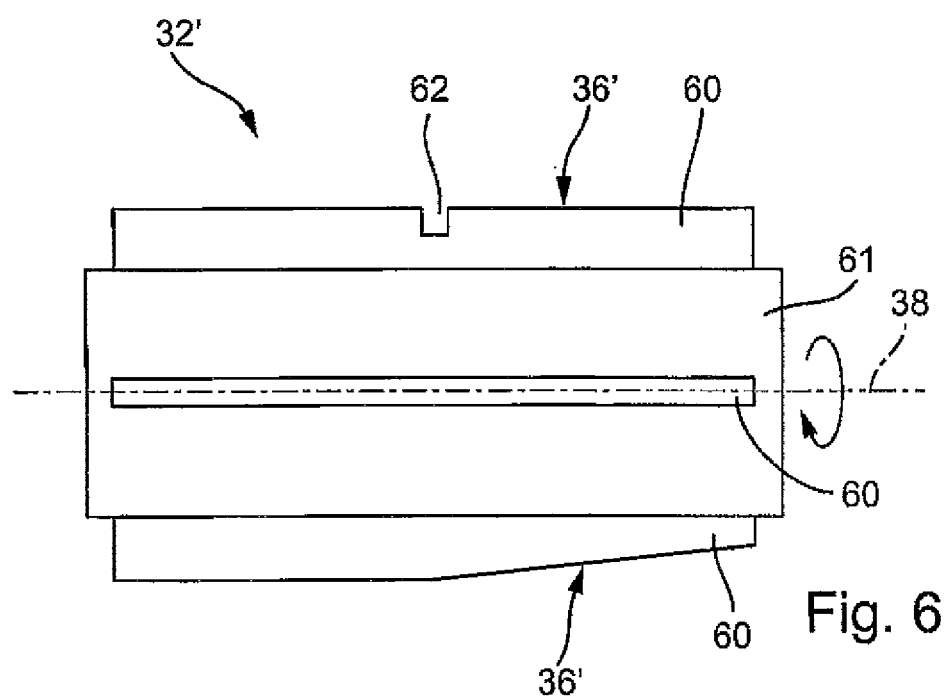
FIG. 6 shows a diaphragm arrangement of the light module shown in FIG. 4.

In FIG. 6, the individual diaphragm elements are denoted by the reference symbol 60. Said diaphragm elements can also be an integral part of the drum body 61, as a deviation from the embodiment illustrated. They have upper edges 36' with different contour profiles. The diaphragm element 60, which is directed downwards in FIG. 6, is used for generating a conventional lower beam light distribution with an asymmetrical light-dark boundary, as is conventional in Europe. Therefore, the lower diaphragm element has a horizontal section on the left-hand side and a section which falls at an angle of approximately 15° on the right-hand side. The upwardly directed diaphragm element 60 is arranged in the beam path of the light module 23 shown in FIG. 4 and therefore forms the so-called effective upper edge 36'. The upper edge 36' of the upper diaphragm element 60 is designed to generate the light distribution illustrated in FIG. 9. In particular, the substantially horizontal profile of the upper edge 36' generates the symmetrical light-dark boundary 13 of the light distribution 10. In addition, a slot 62 is introduced into the profile of the upper edge 36', said slot being used for generating the illuminated region 14 above the light-dark boundary 13.

A third exemplary embodiment of a light module 23 is illustrated in FIG. 5 in a view from the front, i.e. counter to the light exit direction 20. This module 23 comprises a combination of a reflection module and a projection module. LEDs 70, 71 are used as light sources. Said LEDs are arranged on a heat sink 72.

First LEDs 70 are arranged on the upper side and the lower side of the heat sink 72. The light emitted by said LEDs is reflected in the light exit direction 20 by primary optical elements in the form of half-shell reflectors 73. The LEDs 70 and the reflectors 73 form a reflection module of the light module 23. The reflection module can generate a broad basic light distribution which is similar to or identical to the light distribution generated by the second light module 24 of the headlamp 2.

Further LEDs 71 are arranged on the front side of the heat sink 72. The light emitted by said further LEDs 71 is focused by a primary optical element in the form of front optical elements 74 made from a transparent material with totalreflection properties. The focused light is projected by a secondary optical element in the form of a projection lens 75 in the light exit direction 20. The LEDs 71, the front optical elements 74 and the lens 75 form a projection module of the light module 23. The projection module can generate a spotlight distribution. Superimposition of the basic light distribution of the reflection module and the spotlight distribution results in the desired resultant light distribution of the module 23.

A diaphragm arrangement for implementing an effective upper edge which is suitable for generating a lower beam light distribution 10 with a symmetrical or an asymmetrical lightdark boundary 13 with an illuminated region 14 arranged above the light-dark boundary 13 is provided in the beam path of the reflection and/or projection module. The entire module 23 or parts thereof, for example the projection lens 75, can be pivoted about the vertical axis of rotation 37 in order that the illuminated region 14 can be pivoted in the horizontal direction and can be directed in a targeted manner onto objects detected in front of the vehicle 1.

As can be seen from the diaphragm arrangement in the form of the freeform drum 32' shown in FIG. 6, there is only a limited amount of space for the various diaphragm elements 60 on the outer surface of the drum body 61. In the exemplary embodiment described, four diaphragm elements 60 are arranged on the circumferential surface of the drum 32'. In practice, approximately up to five or six diaphragm elements 60 can be arranged without the generation of the light distribution by the effective upper edge 36' of a diaphragm element 60 being disrupted by adjacent diaphragm elements 60. That is to say that a maximum of six different light distributions can be generated with the diaphragm arrangement 32'. In practice, these are the conventional asymmetrical lower beam, the country road light, the partial upper beam and the upper beam, for example. Additional upper edge contours for further adaptive functions such as motorway light or city light, can also be provided. Depending on the volume of traffic in front of the vehicle and/or environmental conditions surrounding the vehicle, it is possible to automatically switch over between the different light functions. For the automatic upper beam, there should not be another vehicle present in the traffic area in front of the vehicle in the range of the camera 5. As soon as a vehicle appears in the image area of the camera 5, the illumination in the upper beam region needs to be reduced to the lower beam level in the direction of these vehicles in order not to generate excessive glare. This can take place by means of a partial upper beam function.

A partial upper beam light distribution depicted on a measuring screen arranged in front of the vehicle 1 is illustrated by way of example in FIG. 8. The headlamp 3 on the vehicle's own traffic side generates a partial upper beam light distribution 80 on the vehicle's own traffic side. The distribution 80 extends on the opposing traffic side below a substantially horizontal light-dark boundary 81 at approximately −0.3°. The light-dark boundary 81 extends from the outer edge of the roadway on the opposing traffic side to approximately 2° on the vehicle's own traffic side. There, it then merges with a substantially vertical light-dark boundary 82, with the partial upper beam light distribution 80 extending to the right thereof. The transition between the horizontal light-dark boundary 81 and the vertical light-dark boundary 82 takes place in rectangular form, in curved form or in another form, for example by means of a slope 83. By virtue of the partial upper beam light distribution 80, the vehicle's own traffic side is illuminated in the manner of an upper beam and the opposing traffic side is illuminated in the manner of a lower beam. It is activated if it has been identified that there are no vehicles traveling in front, but only oncoming vehicles.

The partial upper beam light distribution 84 on the opposing traffic side, which is generated by the other headlamp 2 arranged on the opposing traffic side of the vehicle 1, operates in a corresponding manner. The distribution 84 is limited by a horizontal light-dark boundary 85 at approximately −0.3° in the vertical direction and by a substantially vertical light-dark boundary 86 at approximately −2° in the horizontal direction and illuminates the opposing traffic side in the manner of an upper beam and the vehicle's own traffic side in the manner of a lower beam. The partial upper beam light distribution 84 is generally activated if vehicles traveling in front have been identified, but no oncoming vehicles have been identified. In practice, the partial upper beam light distribution 84 on the opposing traffic side is activated less frequently. If the horizontal alignment and the width of the partial upper beam can be varied, the partial upper beam can also be activated in the case of road users traveling in front or oncoming road users, with the partial upper beam then needing to be set in such a way that a shading region of the light distribution precisely covers the road users traveling in front and/or oncoming road users.

If there is no space available for a further diaphragm element 60 for generating the further light function in the form of the lower beam light distribution 10 with the illuminated region 14 arranged above the light-dark boundary 13 on the outer surface of the drum body 61, a diaphragm element 60 for an existing light function can be replaced by the diaphragm element 60 for generating the further light function. In this case, it is possible for the diaphragm element 60 of the light module 23 of the headlamp 2 on the opposing traffic side, which diaphragm element is designed to implement an effective upper edge 36' for generating the partial upper beam light distribution 84 on the opposing traffic side, to be replaced by the diaphragm element 60 for generating the lower beam light distribution 10 with the illuminated region 14 arranged above the light-dark boundary 13.

Corresponding space-related problems can also result in the case of a diaphragm arrangement 32 as shown in FIGS. 7a and 7b since the effective upper edge 36 of the diaphragm arrangement 32 should be arranged as far as possible in a focal point of the reflector 31, which is always more difficult in the case of a large number of individual diaphragm elements 40, 41 arranged one behind the other in the direction of the optical axis 33 of the light module 23. For this reason, it is also possible to find a solution here by virtue of the diaphragm elements 40, 41 and possibly further diaphragm elements being designed in such a way that, in a corresponding position of the guide pin 45 in the slotted-link guides 43, 44, they can generate the lower beam light distribution 10 with the illuminated region 14 arranged above the light-dark boundary 13 instead of a partial upper beam on the opposing traffic side.

The preferred headlamp system of the vehicle 1 therefore comprises the headlamp 2 on the opposing traffic side, whose one light module 23 has a diaphragm arrangement 32, 32' for generating an adaptive light distribution. The diaphragm arrangement 32, 32' is designed in such a way that it can generate at least a conventional asymmetrical lower beam, country road light, upper beam and the lower beam light distribution 10 with the illuminated region 14 arranged above the light-dark boundary 13. In addition, it can also generate a motorway light or city light. The partial upper beam light distribution 84 on the opposing traffic side can therefore not be generated by the headlamp 2. The headlamp 3 on the vehicle's own traffic side likewise has a light module with a diaphragm arrangement for generating an adaptive light distribution. However, the diaphragm arrangement is designed in such a way that it can generate at least a conventional asymmetrical lower beam, country road light, upper beam and a partial upper beam light distribution 80 on the vehicle's own traffic side. In addition, it can also generate a motorway light or city light. The lower beam light distribution 10 with the illuminated region 14 arranged above the light-dark boundary 13 is not generated by the headlamp 3.

However, it is of course conceivable for both headlamps 2, 3 of the vehicle 1 to be able to generate the lower beam light distribution 10 with the illuminated region 14 arranged above the light-dark boundary 13.

The invention claimed is:

1. A light module for a motor vehicle headlamp for generating an adaptive light distribution, which light module comprises
   at least one light source for emitting light,
   at least one primary optical element for focusing the emitted light,
   a diaphragm arrangement for implementing a variable effective upper edge, which can be introduced into a beam path of the emitted and/or focused light, and
   a secondary optical element for imaging the light passing the effective upper edge of the diaphragm arrangement on a roadway in front of the vehicle, where the diaphragm arrangement is designed to implement an effective upper edge which brings about the generation of a lower beam light distribution with a substantially horizontal light-dark boundary and a slot cutout from the effective upper edge of the diaphragm providing an illuminated region formed at a specific horizontal position above the light-dark boundary, which region is delimited on the right-hand side and on the left-hand side by light-dark boundaries and has an extent in the horizontal and vertical directions of in each case at least 2° horizontal and approximately 3° to 5° vertical on a measuring screen arranged at a distance in front of the headlamp.

2. The light module as claimed in claim 1, wherein the illuminated region is delimited on the right-hand side and on the left-hand side at least partially by vertical light-dark boundaries.

3. The light module as claimed in claim 1, wherein the light module comprises means for horizontally pivoting the light module or a part thereof in order to direct the illuminated region above the horizontal light-dark boundary in a targeted manner onto objects detected in front of the vehicle.

4. The light module as claimed in claim 3, wherein the means for horizontally pivoting the light module are provided for implementing a dynamic cornering light function of the headlamp.

5. The light module as claimed in claim 1, wherein the diaphragm arrangement has a drum, which is capable of rotating about a horizontal axis of rotation running transversely with respect to the optical axis, with a plurality of additional upper edges, which are spaced apart from one another, run transversely with respect to the optical axis and have different profiles, being formed on the outer surface of said drum, and with one of the upper edges forming the effective upper edge for generating the lower beam light distribution with the illuminated region provided above the light-dark boundary.

6. The light module as claimed in claim 1, wherein the diaphragm arrangement has a plurality of diaphragm elements, which run substantially transversely with respect to the optical axis are capable of moving relative to one another about a horizontal axis of rotation arranged parallel to the optical axis, one of the upper edges or a plurality of upper edge forming, by means of superimposition, the effective upper edge for generating the lower beam light distribution with the illuminated region provided above the light-dark boundary.

7. The light module as claimed in claim 1, wherein the at least one light source comprises one or more semiconductor light sources.

8. The light module as claimed in claim 7, wherein the at least one primary optical element comprises one or more optically effective elements, which focus the emitted light by means of total reflection.

9. The light module as claimed in claim 1, wherein the a secondary optical element is in the form of a projection lens.

10. A light module for a motor vehicle headlamp for generating an adaptive light distribution, which light module comprises
at least one light source for emitting light,
at least one primary optical element for focusing the emitted light,
a diaphragm arrangement for implementing a variable effective upper edge, which can be introduced into a beam path of the emitted and/or focused light, and
a secondary optical element for imaging the light passing the effective upper edge of the diaphragm arrangement on a roadway in front of the vehicle, where the diaphragm arrangement is designed to implement an effective upper edge Which brings about the generation of a lower beam light distribution with a substantially horizontal light-dark boundary and a slot is cutout from the upper edge of the diaphragm providing an illuminated region formed at a specific horizontal position above the light-dark boundary, which region is delimited on the right-hand side and on the left-hand side by light-dark boundaries and has an extent in the horizontal and vertical directions of in each case at least 2° horizontal and approximately 3° to 5° vertical on a measuring screen arranged at a distance in front of the headlamp.

11. The motor vehicle headlamp claimed in claim 10, wherein the light module is designed for implementing a spotlight function, and the headlamp has a further light module for implementing basic illumination, with both light modules together forming the lower beam light distribution.

12. A headlamp system for a motor vehicle for illuminating a roadway in front of the motor vehicle with an adaptive light distribution, which headlamp system comprises, on the nose of the vehicle, in each case at least one motor vehicle headlamp on the vehicle's own traffic side and one headlamp on the opposing traffic side, means for recording an image of a region in front of the vehicle and means for evaluating the recorded image for detecting objects in front of the vehicle, at least one of the headlamps having at least one light module for generating an adaptive light distribution, which light module comprises
at least one light source for emitting light,
at least one primary optical element for focusing the emitted light,
a diaphragm arrangement for implementing a variable effective upper edge, which can be introduced into a beam path of the emitted and/or focused light, and
a secondary optical element for imaging the light passing the effective upper edge of the diaphragm arrangement on a roadway in front of the vehicle, where the diaphragm arrangement of at least one of the light modules of at least one headlamp is designed to implement an effective upper edge which brings about the generation of a lower beam light distribution with a substantially horizontal light-dark boundary and a slot cutout from the upper edge of the diaphragm providing an illuminated region formed at a specific horizontal position above the light-dark boundary, which region is delimited on the right-hand side and on the left-hand side by light-dark boundaries and has an extent in the horizontal and vertical directions of in each case at least 2° horizontal and approximately 3° to 5° vertical on a measuring screen arranged at a distance in front of the headlamp.

13. The headlamp system as claimed in claim 12, wherein only the headlamp which is arranged on the opposing traffic side has a light module with a diaphragm arrangement which is designed for implementing an upper edge which brings about the generation of the lower beam light distribution with the illuminated region formed above the light-dark boundary.

14. The headlamp system as claimed in claim 12, wherein the means for recording the image of a region in front of the vehicle is in the form of a camera.

15. The headlamp system as claimed in claim 14, wherein the camera records the image by receiving and processing invisible IR radiation.

16. The headlamp system as claimed in claim 15, wherein the camera is part of a night vision system of the vehicle, which presents the driver of the vehicle with the image of the region in front of the vehicle which has been recorded by means of the camera by means of a display or a projection onto a windshield of the vehicle.

17. The light module as claimed in claim 12, wherein the secondary optical element is in the form of a projection lens.

* * * * *